(12) United States Patent
Han et al.

(10) Patent No.: US 11,774,167 B2
(45) Date of Patent: Oct. 3, 2023

(54) VACUUM ADIABATIC BODY AND REFRIGERATOR

(71) Applicant: LG ELECTRONICS INC., Seoul (KR)

(72) Inventors: Sol Han, Seoul (KR); Minsu Ryu, Seoul (KR); Jaehyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 494 days.

(21) Appl. No.: 16/635,699

(22) PCT Filed: Jul. 31, 2018

(86) PCT No.: PCT/KR2018/008687
§ 371 (c)(1),
(2) Date: Jan. 31, 2020

(87) PCT Pub. No.: WO2019/027227
PCT Pub. Date: Feb. 7, 2019

(65) Prior Publication Data
US 2021/0123660 A1    Apr. 29, 2021

(30) Foreign Application Priority Data
Aug. 1, 2017    (KR) .................. 10-2017-0097793

(51) Int. Cl.
*F25D 23/06*    (2006.01)
*F16L 59/065*   (2006.01)

(52) U.S. Cl.
CPC .......... *F25D 23/063* (2013.01); *F16L 59/065* (2013.01); *F25D 23/06* (2013.01); *F25D 2201/14* (2013.01); *F25D 2317/043* (2013.01)

(58) Field of Classification Search
CPC ...... F25D 23/06; F25D 23/063; F25D 23/065; F25D 23/067; F25D 19/006; F25D 2201/14; F25D 2317/043; F16L 59/02
See application file for complete search history.

(56) References Cited

U.S. PATENT DOCUMENTS

| 1,420,711 A | 6/1922 | Knutson |
| 1,814,114 A | 7/1931 | Bodman |
| (Continued) | | |

FOREIGN PATENT DOCUMENTS

| CN | 2066123 | 11/1990 |
| CN | 1056276 | 11/1991 |
| (Continued) | | |

OTHER PUBLICATIONS

Machine translation for JP2012207682 (Year: 2012).*
(Continued)

*Primary Examiner* — Joseph F Trpisovsky
(74) *Attorney, Agent, or Firm* — KED & ASSOCIATES, LLP

(57) ABSTRACT

A vacuum adiabatic body and a refrigerator are provided. The vacuum adiabatic body may include a sheet base provided in a direction crossing a vacuum space between a first plate and a second plate, and at least one sheet protrusion that protrudes from the sheet base in at direction toward one of the first plate or the second plate to maintain an interval between the sheet base and the one of the first plate or the second plate.

20 Claims, 15 Drawing Sheets

(56) References Cited

U.S. PATENT DOCUMENTS

| | | |
|---|---|---|
| 1,845,353 A | 2/1932 | Snell |
| 2,000,882 A | 5/1935 | Comstock |
| 2,065,608 A | 12/1936 | Munters |
| 2,464,526 A | 3/1949 | Palmer |
| 2,989,156 A | 6/1961 | Brooks et al. |
| 3,156,975 A | 11/1964 | Shaw |
| 3,161,265 A | 12/1964 | Matsch et al. |
| 3,338,451 A | 8/1967 | Kesling |
| 3,936,553 A | 2/1976 | Rowe |
| 4,545,211 A | 10/1985 | Gaus |
| 4,545,213 A | 10/1985 | Fujiwara et al. |
| 4,705,099 A | 11/1987 | Taniguchi et al. |
| 4,732,432 A | 3/1988 | Keil |
| 4,826,040 A | 5/1989 | Jahr, Jr. et al. |
| 4,837,388 A | 6/1989 | Kugelmann |
| 5,011,729 A | 4/1991 | McAllister |
| 5,157,893 A | 10/1992 | Benson et al. |
| 5,214,877 A | 6/1993 | Kaspar et al. |
| 5,500,305 A | 3/1996 | Bridges |
| 5,720,536 A | 2/1998 | Jenkins et al. |
| 5,860,594 A | 1/1999 | Reason et al. |
| 6,038,830 A | 3/2000 | Hirath et al. |
| 6,088,966 A | 7/2000 | Kenkel |
| 6,393,798 B1 | 5/2002 | Hirath et al. |
| 6,769,265 B1 | 8/2004 | Davis |
| 7,571,582 B2 | 8/2009 | Hirai et al. |
| 7,891,203 B1 | 2/2011 | Burns et al. |
| 8,752,921 B2 | 6/2014 | Görz et al. |
| 8,765,247 B2 | 7/2014 | Park |
| 8,822,006 B2 | 9/2014 | Yoon et al. |
| 9,170,046 B2 | 10/2015 | Jung |
| 10,274,247 B2 | 4/2019 | Jeong et al. |
| 10,337,788 B2 | 7/2019 | Jung et al. |
| 10,543,560 B2 | 1/2020 | Nakakura et al. |
| 10,639,743 B2 | 5/2020 | Azuma et al. |
| 10,753,669 B2 | 8/2020 | Dherde et al. |
| 10,760,849 B2 | 9/2020 | Jung et al. |
| 10,823,485 B2 | 11/2020 | Lv et al. |
| 10,837,696 B2 | 11/2020 | Jung et al. |
| 10,899,264 B2 | 1/2021 | Jung et al. |
| 10,907,887 B2 | 2/2021 | Jung et al. |
| 10,913,232 B2 | 2/2021 | Dye et al. |
| 10,941,974 B2 | 3/2021 | Jung et al. |
| 11,047,616 B2 | 6/2021 | Jeong et al. |
| 2002/0041134 A1 | 4/2002 | Wolf et al. |
| 2002/0056184 A1 | 5/2002 | Richardson et al. |
| 2004/0080122 A1 | 4/2004 | Beyrle |
| 2004/0226956 A1 | 11/2004 | Brooks |
| 2005/0053755 A1 | 3/2005 | Markey |
| 2009/0007587 A1 | 1/2009 | Lanzl et al. |
| 2010/0071384 A1 | 3/2010 | Lu |
| 2010/0251653 A1 | 10/2010 | Mills |
| 2010/0252698 A1 | 10/2010 | Dye et al. |
| 2010/0283359 A1 | 11/2010 | Hottmann et al. |
| 2011/0204065 A1 | 8/2011 | Kolowich |
| 2011/0241513 A1 | 10/2011 | Nomura |
| 2012/0103006 A1 | 5/2012 | Jung et al. |
| 2012/0104923 A1 | 5/2012 | Jung et al. |
| 2012/0128920 A1* | 5/2012 | Yoon .................. F16L 59/07 428/188 |
| 2012/0196059 A1 | 8/2012 | Fujimori |
| 2013/0105494 A1 | 5/2013 | Jung |
| 2013/0105495 A1 | 5/2013 | Jung |
| 2013/0111942 A1 | 5/2013 | Jung |
| 2013/0200084 A1 | 8/2013 | Jung et al. |
| 2013/0230684 A1 | 9/2013 | Shinoki et al. |
| 2014/0322481 A1 | 10/2014 | Song et al. |
| 2015/0044412 A1 | 2/2015 | Miyaji et al. |
| 2016/0109172 A1 | 4/2016 | Kim et al. |
| 2016/0258671 A1 | 9/2016 | Allard et al. |
| 2018/0017314 A1 | 1/2018 | Jeong et al. |
| 2018/0216872 A1 | 8/2018 | Jung et al. |
| 2018/0216873 A1 | 8/2018 | Jung et al. |
| 2018/0224052 A1 | 8/2018 | Jung et al. |
| 2018/0224193 A1 | 8/2018 | Jung et al. |
| 2018/0224194 A1 | 8/2018 | Jung et al. |
| 2018/0224195 A1 | 8/2018 | Jung et al. |
| 2018/0224196 A1 | 8/2018 | Jung et al. |
| 2018/0224197 A1 | 8/2018 | Jung et al. |
| 2018/0224198 A1 | 8/2018 | Jung et al. |
| 2018/0231298 A1 | 8/2018 | Jung et al. |
| 2018/0231300 A1 | 8/2018 | Jung et al. |
| 2018/0238486 A1 | 8/2018 | Jung et al. |
| 2018/0238610 A1 | 8/2018 | Jung et al. |
| 2018/0356147 A1 | 12/2018 | Jung et al. |
| 2019/0255980 A1 | 8/2019 | Jung et al. |
| 2020/0182393 A1 | 6/2020 | Jung et al. |
| 2021/0140704 A1 | 5/2021 | Kim et al. |

FOREIGN PATENT DOCUMENTS

| | | |
|---|---|---|
| CN | 1276055 | 12/2000 |
| CN | 1276056 | 12/2000 |
| CN | 1603674 | 4/2005 |
| CN | 2691933 | 4/2005 |
| CN | 2720362 | 8/2005 |
| CN | 102121781 | 7/2011 |
| CN | 102455103 | 5/2012 |
| CN | 102455105 | 5/2012 |
| CN | 103090616 | 5/2013 |
| CN | 103502756 | 1/2014 |
| CN | 104204646 | 12/2014 |
| CN | 104296490 | 1/2015 |
| CN | 204141054 | 2/2015 |
| CN | 104457117 | 3/2015 |
| CN | 104482707 | 4/2015 |
| CN | 104833157 | 8/2015 |
| CN | 104913571 | 9/2015 |
| CN | 205350719 | 6/2016 |
| CN | 106016957 | 10/2016 |
| CN | 205784134 | 12/2016 |
| CN | 106500428 | 3/2017 |
| CN | 106766594 | 5/2017 |
| CN | 107257907 | 10/2017 |
| CN | 107923701 | 4/2018 |
| CN | 208281706 | 12/2018 |
| CN | 208472996 | 2/2019 |
| CN | 109403210 | 3/2019 |
| DE | 10 2011 050472 | 11/2011 |
| EP | 1 564 513 | 8/2005 |
| EP | 2154457 | 2/2010 |
| EP | 2462372 | 10/2016 |
| GB | 890372 | 2/1962 |
| JP | S 60-179344 | 9/1985 |
| JP | 01-142379 | 6/1989 |
| JP | 01-179882 | 7/1989 |
| JP | H05-9298 | 2/1993 |
| JP | H07-091591 | 4/1995 |
| JP | 2001-277396 | 10/2001 |
| JP | 2002-071088 | 3/2002 |
| JP | 2002-221295 | 8/2002 |
| JP | 2003-042388 | 2/2003 |
| JP | 2004-211376 | 7/2004 |
| JP | 2006-082604 | 3/2006 |
| JP | 2012-021615 | 2/2012 |
| JP | 2012-207682 | 10/2012 |
| JP | 2013-007439 | 1/2013 |
| JP | 2013-108738 | 6/2013 |
| JP | 2013-189996 | 9/2013 |
| JP | 5316672 | 10/2013 |
| JP | 2014-051993 | 3/2014 |
| KR | 10-2001-0073363 | 8/2001 |
| KR | 10-0343719 | 7/2002 |
| KR | 10-0363646 | 11/2002 |
| KR | 20-0303619 | 2/2003 |
| KR | 10-2004-0002175 | 1/2004 |
| KR | 10-2004-0042682 | 5/2004 |
| KR | 10-2007-0037274 | 4/2007 |
| KR | 10-0845153 | 7/2008 |
| KR | 10-2010-0109653 | 10/2010 |
| KR | 10-2011-0015327 | 2/2011 |
| KR | 10-2011-0113414 | 11/2011 |
| KR | 10-2012-0139648 | 12/2012 |
| KR | 10-2013-0084561 | 7/2013 |

(56) References Cited

FOREIGN PATENT DOCUMENTS

| | | |
|---|---|---|
| KR | 10-1456376 | 10/2014 |
| KR | 10-2015-0012712 | 2/2015 |
| KR | 10-2015-0109727 | 8/2015 |
| KR | 10-2016-0079278 | 7/2016 |
| KR | 20-2017-0000187 | 1/2017 |
| KR | 10-2017-0016190 | 2/2017 |
| KR | 10-2017-0016244 | 2/2017 |
| KR | 10-2017-0071623 | 6/2017 |
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| RU | 2 627 067 | 8/2017 |
| WO | WO 91/19867 | 12/1991 |
| WO | WO 01/04553 | 1/2001 |
| WO | WO 02/069673 | 9/2002 |
| WO | WO 2012/176880 | 12/2012 |
| WO | WO 2015/189009 | 12/2015 |
| WO | WO 2016/105019 | 6/2016 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |
| WO | WO 2017/023102 | 2/2017 |
| WO | WO 2017/105030 | 6/2017 |

OTHER PUBLICATIONS

Chinese Office Action dated Sep. 3, 2021 issued in CN Application No. 201880050572.7.
International Search Report and Written Opinion dated Nov. 8, 2018 issued in Application No. PCT/KR2018/008687.
Chinese Office Action dated Dec. 9, 2020 issued in CN Application No. 201880053044.7.
European Search Report issued in Application No. 18840183.0 dated Mar. 29, 2021.
European Search Report dated Mar. 24, 2021 issued in Application No. 18846385.5.
European Search Report dated Mar. 24, 2021 issued in Application No. 18840407.3.
U.S. Appl. No. 16/635,793, filed Jan. 31, 2020.
International Search Report and Written Opinion dated Nov. 21, 2018 issued in Application No. PCT/KR2018/008691.
International Search Report and Written Opinion dated Nov. 23, 2018 issued in Application No. PCT/KR2018/008689.
International Search Report and Written Opinion dated Nov. 23, 2018 issued in Application. No. PCT/KR2018/008694.
International Search Report and Written Opinion dated Nov. 29, 2018 Issued in Application No. PCT/KR2018/008698.
Chinese Office Action dated Sep. 28, 2021 issued in CN Application No. 201880050571.2.
Australian Office Action dated Feb. 11, 2021 issued in AU Application No. 2018309538.
European Search Report dated Mar. 24, 2021 issued in EP Application No. 18842051.7.
Korean Office Action dated Dec. 21, 2021 issued in KR Application No. 10-2017-0097793.
Korean Office Action dated Dec. 21, 2021 issued in KR Application No. 10-2017-0097804.
Russian Office Action dated Mar. 9, 2022 issued in RU Application No. 2020142423.
Australian Examination Report dated Feb. 17, 2021 issued in Application No. 2018309544.
Russian Office Action dated Jun. 22, 2020 issued in RU Application No. 2020108484.
Chinese Office Action issued in Application No. 202110908473.1 dated Jul. 5, 2022.
Chinese Office Action issued in Application No. 202110909689.X dated Jul. 12, 2022.
United States Office Action dated Sep. 27, 2021 issued in co-pending related U.S. Appl. No. 16/637,861.
U.S. Office Action dated May 3, 2021 issued in U.S. Appl. No. 16/635,793.
Korean Office Action dated Dec. 24, 2021 issued in KR Application No. 10-2017-0097831.
United States Office Action dated Oct. 29, 2021 issued in co-pending related U.S. Appl. No. 16/635,776.
U.S. Final Office Action dated Mar. 21, 2022 issued in U.S. Appl. No. 16/635,776.
U.S. Office Action dated Jul. 7, 2021 issued in U.S. Appl. No. 16/635,729.
Russian Office Action dated Feb. 20, 2021.
U.S. Office Action issued in U.S. Appl. No. 16/635,758 dated Mar. 30, 2022.
Russian Office Action dated Sep. 18, 2020 issued in Application No. 2020110370/12.
Australian Office Action dated Mar. 9, 2021 issued in AU Application No. 2018309541.
European Search Report dated Mar. 30, 2021 issued in EP Application No. 18840503.9.
Chinese Office Action dated Dec. 2, 2020 issued in Application No. 201880050497.4.
Chinese Office Action dated Feb. 1, 2021 issued in CN Application No. 201880050501.7.
Chinese Office Action dated Apr. 15, 2022 issued in CN Application No. 201880050571.2.
Chinese Office Action dated Dec. 9, 2020 issued in Application No. 201880050202.3.
European Search Report issued in Application No. 18840899.1 dated Apr. 7, 2021.
U.S. Appl. No. 16/635,729, filed Jan. 31, 2020.
U.S. Appl. No. 16/635,759, filed Jan. 31, 2020.
United States Office Action dated Sep. 21, 2022 issued in co-pending related U.S. Appl. No. 16/635,758.
United States Notice of Allowance dated Dec. 14, 2022 issued in co-pending related U.S. Appl. No. 16/635,758.
Korean Office Action dated Jul. 23, 2022 issued in Application No. 10-2017-0103444.
European Search Report issued in Application No. 22180209.3 dated Nov. 9, 2022.
Korean Office Action issued in Application No. 10-2022-0092973 dated Jan. 18, 2023.
Chinese Office Action issued in Application No. 202210666073.9 dated Mar. 30, 2023.
U.S. Appl. No. 16/635,699, filed Jan. 31, 2020.
U.S. Appl. No. 17/976,348, filed Oct. 28, 2022.
U.S. Appl. No. 16/635,758, filed Jan. 31, 2020.
U.S. Appl. No. 18/124,038, filed Mar. 21, 2023.
U.S. Appl. No. 16/635,776, filed Jan. 31, 2020.
U.S. Appl. No. 17/583,566, filed Jan. 25, 2022.
U.S. Appl. No. 16/637,861, filed Feb. 10, 2020.

* cited by examiner

FIG. 4

| Group | General plastic | | | | Engineering plastic | | | |
|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | * 151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa-m-k/W | 79 | 460 | 689 | 448 | 189 | 357 | 420 | 552 |
| Heat Deflection Temp at 264 psi | ℃ | 80 | 132 | 146 | 125 | 126 | 121 | 105 ~ 260 | 160 |
| Max Operating Temperature | ℃ | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

VACUUM ADIABATIC BODY AND REFRIGERATOR

This application is a U.S. National Stage Application under 35 U.S.C. § 371 of PCT Application No. PCT/KR2018/008687, filed Jul. 31, 2018, which claims priority to Korean Patent Application No. 10-2017-0097793, filed Aug. 1, 2017, whose entire disclosures are hereby incorporated by reference.

BACKGROUND

Field

A vacuum adiabatic body and a refrigerator are disclosed herein.

Background

A vacuum adiabatic body is a product for suppressing heat transfer by vacuumizing an interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, an internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and an exterior of the vacuum adiabatic panel is finished with a separate molding as Styrofoam. According to the method, additional foaming is not required, and adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2040226956A1 (Reference Document 3). However, it is difficult to obtain a practical level of an adiabatic effect by providing a wall of the refrigerator with sufficient vacuum. In detail, there are limitations in that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Patent Application No. 10-2011-0113414 (Reference Document 4) in consideration of the above-described limitations. Reference Document 4 proposes a refrigerator including a vacuum adiabatic body. Particularly, a space maintenance member for installing a radiation resistance sheet is built.

According to the document, it is difficult to install the radiation resistance sheet in a supporting unit, particularly, when the radiation resistance sheet is inserted, the space maintenance member for maintaining a space has to be separately inserted. In addition, as a member made of a resin material is used, a weight, cost, and outgassing increase. Further, as the space maintenance member having a predetermined thickness has to be installed, there is a limitation in securing an adiabatic thickness of the vacuum adiabatic body.

Embodiments provide a vacuum adiabatic body that solves installation inconvenience of a radiation resistance sheet and a refrigerator. Embodiments also provide a vacuum adiabatic body that solves a limitation of an increase in weight, cost, and outgassing due to additional usage of a resin material and a refrigerator. Embodiments also provide a vacuum adiabatic body that is not limited in setting of a adiabatic thickness of the vacuum adiabatic body and a refrigerator.

To solve installation inconvenience of a radiation resistance sheet, a self-standing type radiation resistance sheet is disclosed. The self-standing type radiation resistance sheet may include a sheet base provided in a direction crossing an inner space and at least one sheet protrusion protruding from the sheet base in at least one direction of the first plate member and the second plate member to maintain an interval of the sheet base.

To solve an increase of a weight, cost, and outgassing due to an additional usage of a resin material, a position and interval of the self-standing radiation resistance sheet may be fixed by a through-hole, through which a bar maintaining an interval between plate members passes, and the sheet protrusion without applying a separate resin material. For convenient installation, the through-hole through which the bar passes may have a small size at an edge of the sheet base and a large size at an inner portion of the sheet base. For more convenient installation, the through-hole may be defined in an end of the sheet protrusion.

To further reduce the resin material, the sheet protrusion may be provided on both surfaces of the sheet base. To further resist radiation heat transfer, the self-standing radiation resistance sheet may be used in a multilayer. In at least one of two laminated self-standing type radiation resistance sheets, the sheet protrusion may be provided on both surfaces of the sheet base.

A conduction prevention tool for preventing heat conduction from occurring between the self-standing radiation resistance sheet and the plate member may be provided between the self-standing radiation resistance sheet and the plate member. The plurality of radiation resistance sheets may be set in various methods by providing the sheet base having a two-dimensional planar structure and the sheet protrusion protruding from at least one surface of the sheet base to fix the interval between the sheet base and the plate.

The details of one or more embodiments are set forth in the accompanying drawings and the description below. Other features will be apparent from the description and drawings, and from the claims.

According to embodiments, the worker may have the advantage that it is not necessary to separately set a space and position of the radiation resistance sheet only by mounting the radiation resistance sheet. According to embodiments, as a resin material is not used, or a small amount of resin material is used to maintain the space of the radiation resistance sheet, manufacturing costs may be reduced, and also, outgassing may be reduced. According to embodiments, the radiation resistance sheet for reducing radiation heat transfer, which is set for each vacuum adiabatic body, may be designed without being limited.

BRIEF DESCRIPTION OF DRAWINGS

FIG. 4 is a diagram illustrating results obtained by examining resins;

DETAILED DESCRIPTION

Hereinafter, exemplary embodiments will be described with reference to the accompanying drawings. The embodiments may, however, be embodied in many different forms and should not be construed as being limited to the embodiments set forth herein, and a person of ordinary skill in the art, who understands the spirit, may readily implement other embodiments included within the scope of the same concept by adding, changing, deleting, and adding components; rather, it will be understood that they are also included within the scope.

The drawings shown below may be displayed differently from the actual product, or exaggerated or simple or detailed parts may be deleted, but this is intended to facilitate understanding of the technical idea. It should not be construed as limited.

In the following description, the term vacuum pressure means any pressure state lower than atmospheric pressure. In addition, the expression that a vacuum degree of A is higher than that of B means that a vacuum pressure of A is lower than that of B.

Figure 1:
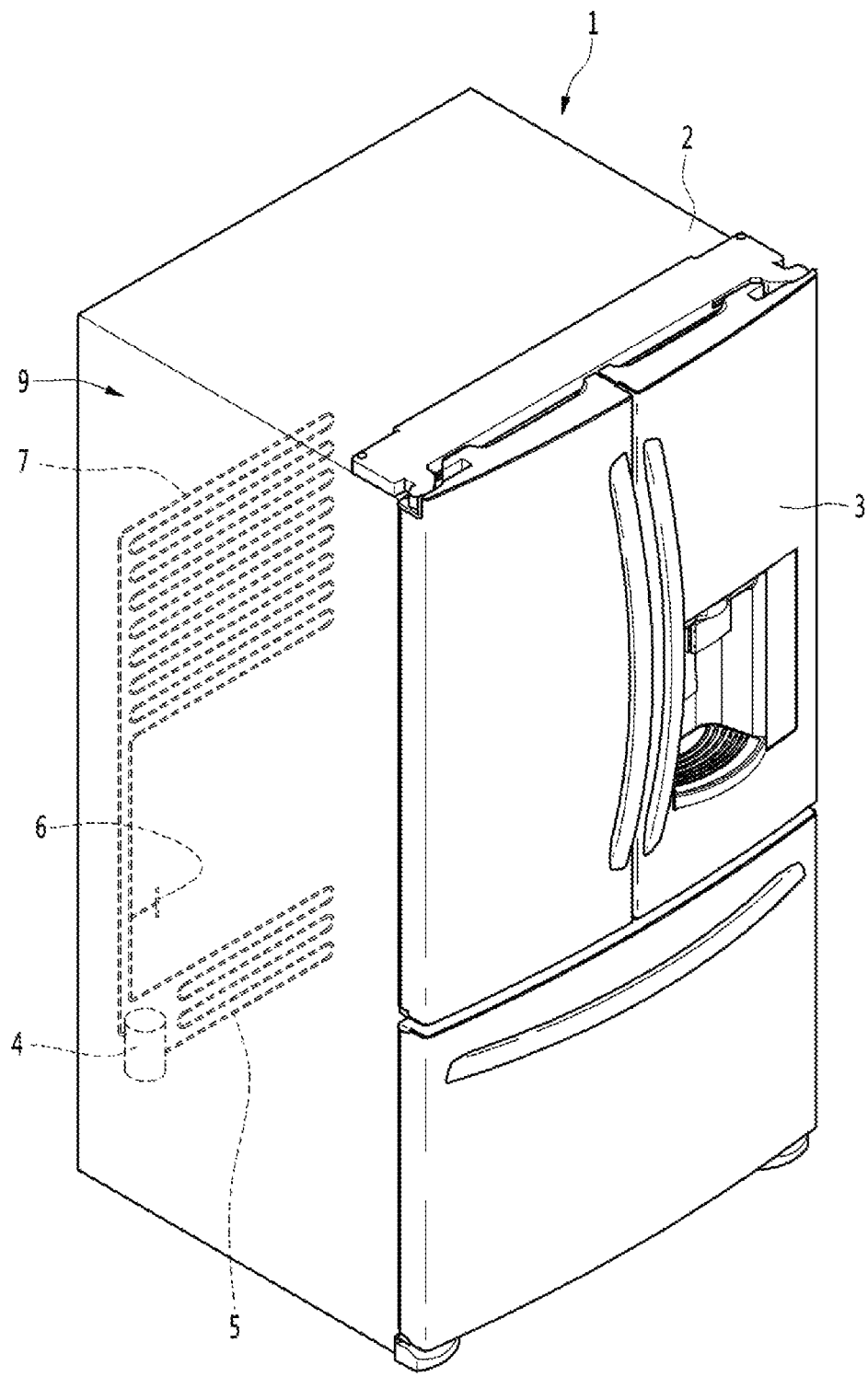
FIG. 1 is a perspective view of a refrigerator according to an embodiment.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment or a freezing compartment.

Parts constituting a freezing cycle in which cold air is supplied into the cavity 9. In detail, the parts include a compressor 4 that compresses a refrigerant, a condenser 5 that condenses the compressed refrigerant, an expander 6 that expands the condensed refrigerant, and an evaporator 7 that evaporates the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting a blowing amount and blowing direction by the fan, adjusting an amount of a circulated refrigerant, or adjusting a compression rate of the compressor, so that it is possible to control a refrigerating space or a freezing space.

Figure 2:
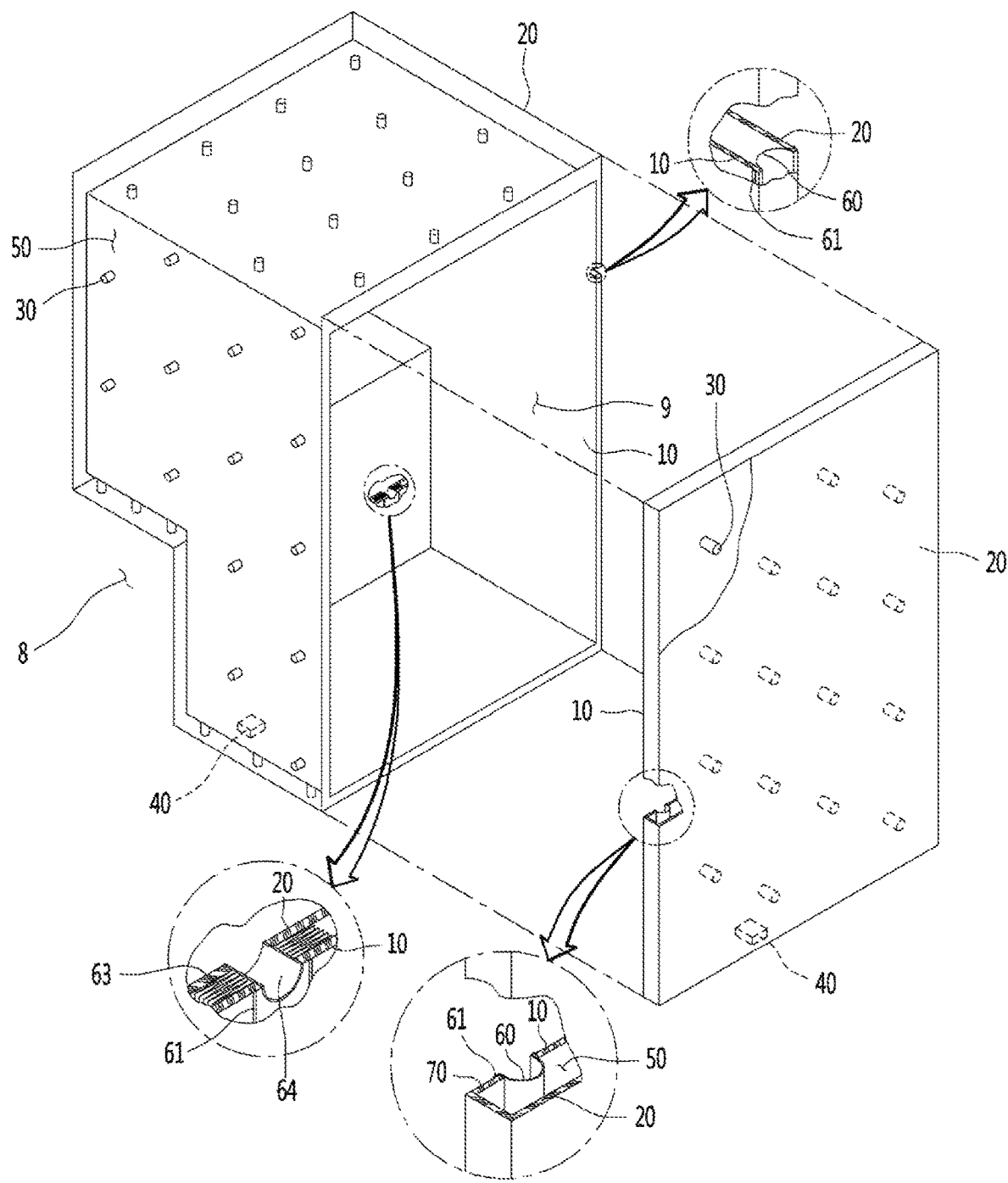
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are schematically illustrated for convenience of understanding.

Referring to FIG. 2, the vacuum adiabatic body includes a first plate member (first plate) 10 for providing a wall of a low-temperature space, a second plate member (second plate) 20 for providing a wall of a high-temperature space, a vacuum space part (vacuum space) 50 defined as an interval part between the first and second plate members 10 and 20. Also, the vacuum adiabatic body includes conductive resistance sheets 60 and 63 for preventing heat conduction between the first and second plate members 10 and 20. A sealing part (sealing) 61 for sealing the first and second plate members 10 and 20 is provided such that the vacuum space part 50 is in a sealed state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. The wall for each space may serve as not only a wall directly contacting (facing) the space but also a wall not contacting (facing) the space. For example, the vacuum adiabatic body of the embodiment may also be applied to a product further having a separate wall contacting (facing) each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50. Hereinafter, a heat resistance unit provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming, for example, may be further provided to another side of the vacuum adiabatic body.

Figure 3A:
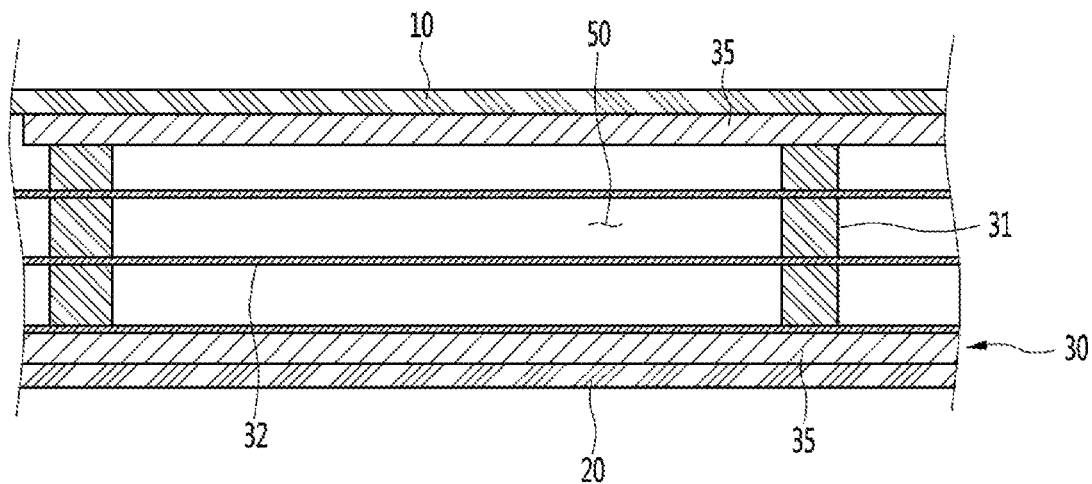
FIGS. 3A-3B are views illustrating various embodiments of an internal configuration of a vacuum space part.
Figure 3B:
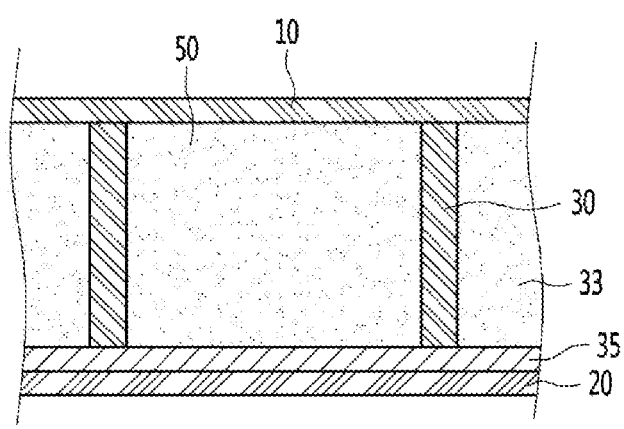

FIGS. 3A-3B are views illustrating various embodiments of an internal configuration of the vacuum space part. Referring to FIG. 3A, the vacuum space part 50 may be provided in a third space having a pressure different from that of each of the first and second spaces, for example, a vacuum state, thereby reducing adiabatic loss. The third space may be provided at a temperature between a temperature of the first space and a temperature of the second space. As the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

A material of the supporting unit 30 will be described hereinafter.

The supporting unit 30 is to have a high compressive strength so as to endure the vacuum pressure. Also, the supporting unit 30 is to have a low outgassing rate and a low water absorption rate so as to maintain the vacuum state. Further, the supporting unit 30 is to have a low thermal conductivity so as to reduce heat conduction between the plate members. Furthermore, the supporting unit 30 is to secure the compressive strength at a high temperature so as to endure a high-temperature exhaust process. Additionally, the supporting unit 30 is to have an excellent machinability so as to be subjected to molding. Also, the supporting unit 30 is to have a low cost for molding. A time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, the ceramic and glass may not be used as the material of the supporting unit 30. Therefore, resin may be considered as the material of the supporting unit 30.

FIG. 4 is a diagram illustrating results obtained by examining resins. Referring to FIG. 4, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, polyethylene resin (PE) is inappropriate to be used due to its high outgassing rate and its low compressive strength. Polychlorotrifluoroetlayiene (PCTFE) is not used due to its remarkably high price. Polyether ether ketone (PEEK) is inappropriate to be used due to its high outgassing rate. Accordingly, it is determined that that a resin selected from the group consisting of polycarbonate (PC), glass fiber PC, low outgassing PC, polyphenylene sulfide (PPS), and liquid crystal polymer (LCP) may be used as the material of the supporting unit. However, an outgassing rate of the PC is 0.19, which is at a low level. Hence, as the time required to perform baking in which exhaustion is performed by applying heat is increased to a certain level, the PC may be used as the material of the supporting unit.

The present inventor has found an optimal material by performing various studies on resins expected to be used inside the vacuum space part. Hereinafter, results of the performed studies will be described with reference to the accompanying drawings.

Figure 5:
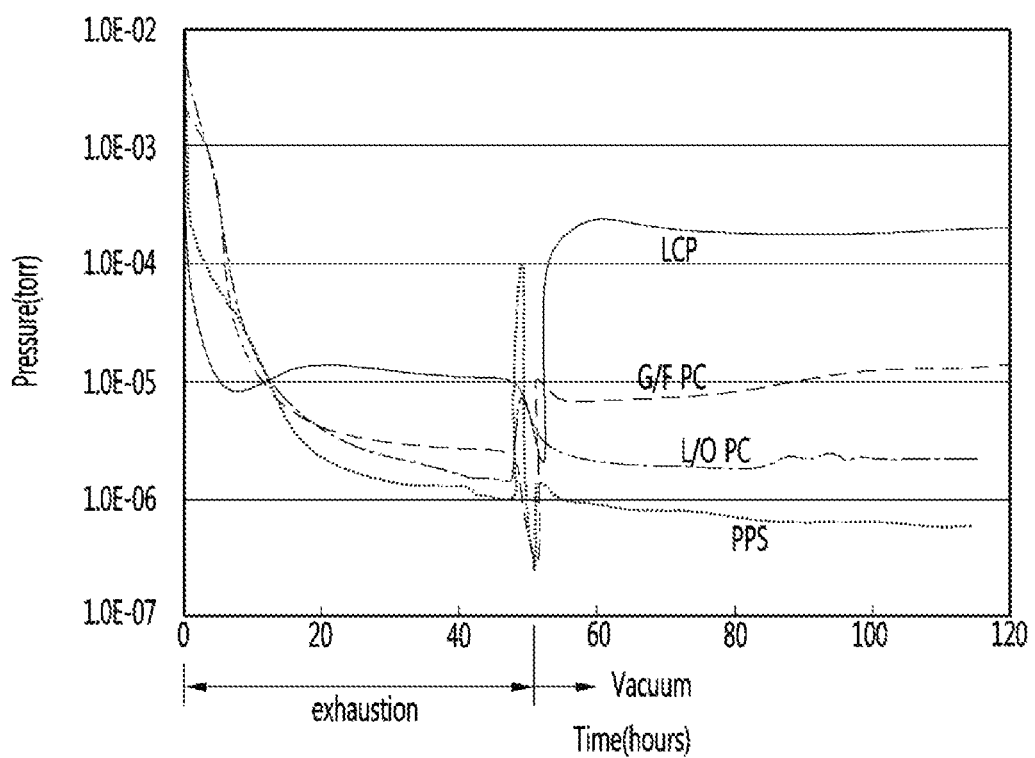
FIG. 5 illustrates results obtained by performing an experiment on vacuum maintenance performances of resins.

FIG. 5 is a view illustrating results obtained by performing an experiment on vacuum maintenance performances of the resins. Referring to FIG. 5, there is illustrated a graph showing results obtained by fabricating the supporting unit using the respective resins and then testing vacuum maintenance performances of the resins. First, a supporting unit fabricated using a selected material was cleaned using ethanol, left at a low pressure for 48 hours, exposed to air for 2.5 hours, and then subjected to an exhaust process at 90° C. for about 50 hours in a state that the supporting unit was put in the vacuum adiabatic body, thereby measuring a vacuum maintenance performance of the supporting unit.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is 5×10−3 Torr, its vacuum performance will be maintained for a time of about 0.5 year. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (L/O PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, fabrication efficiency of the low outgassing PC is lowered.

It may be seen that, in the case of the PPS, its vacuum maintenance performance is remarkably excellent, and its exhaust performance is also excellent. Therefore, it is considered that, based on the vacuum maintenance performance, the PPS is used as the material of the supporting unit.

Figure 6A:
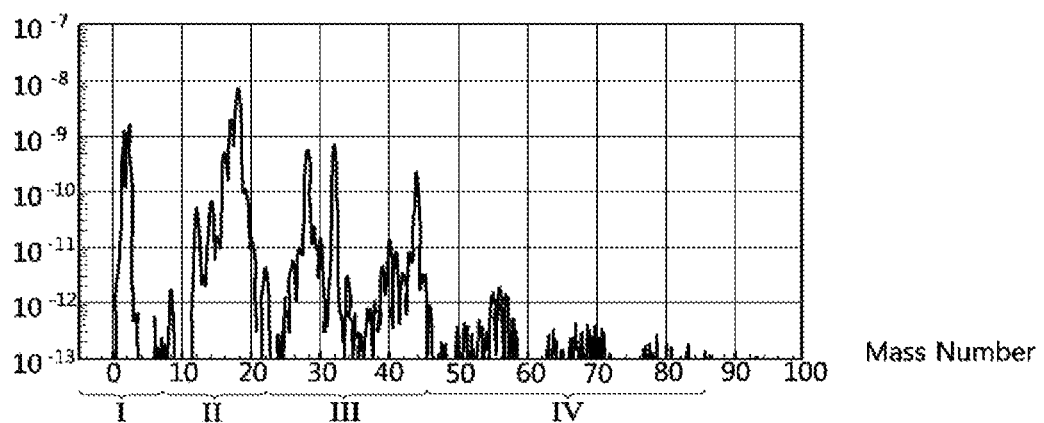
FIGS. 6A-6C are results obtained by analyzing components of gases discharged from polyphenylene sulfide (PPS) and low outgassing polycarbonate (PC)
Figure 6B:
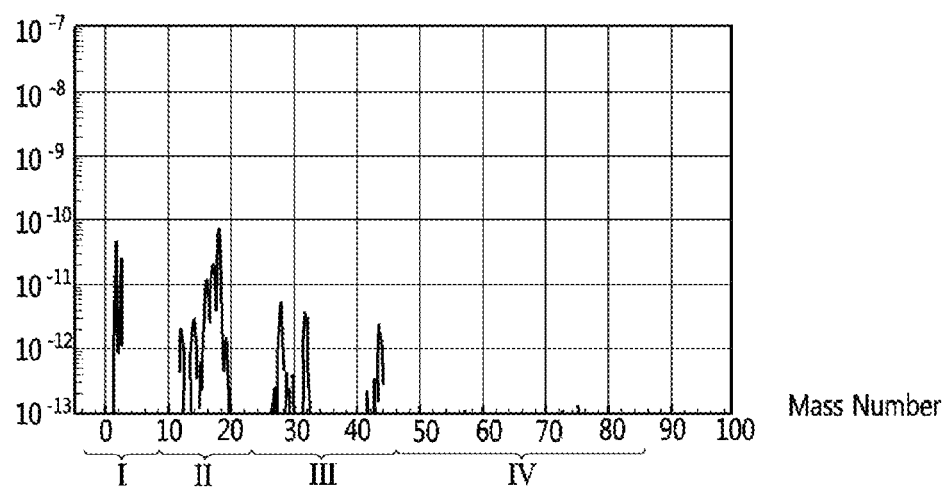
Figure 6C:
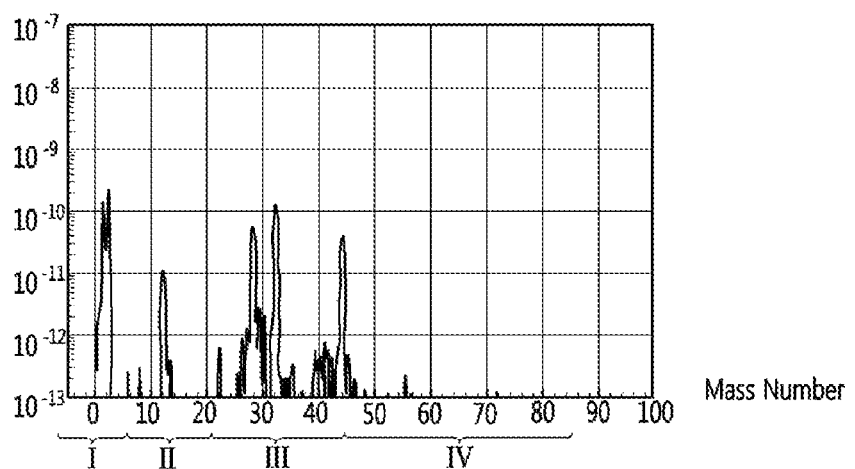

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that $H_2$ series (I), $H_2O$ series (II), $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel. As the analyzed result, it may be re-confirmed that the PPS is excellent as the material of the supporting unit.

Figure 7:
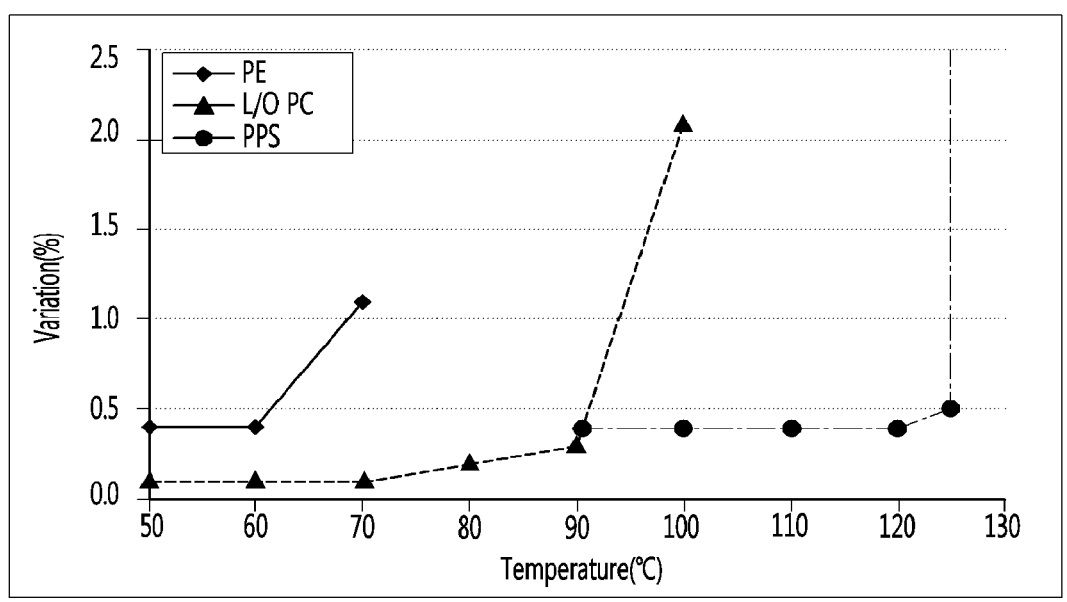
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. The bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS. As the analyzed result, it may be seen that the PPS is most used as the resin used inside of the vacuum space part. However, the low outgassing PC may be used in terms of fabrication cost.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, as the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring back to FIG. 3B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer.

Figure 8A:
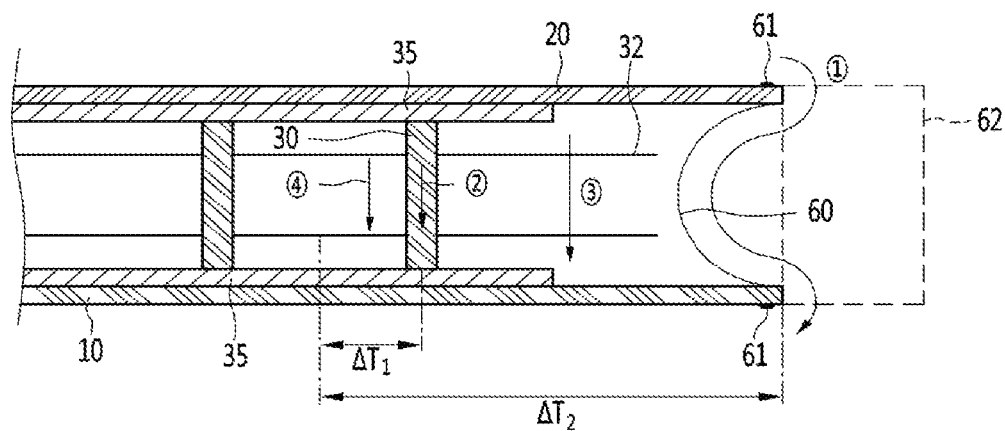
FIGS. 8A-8C are views showing various embodiments of conductive resistance sheets and peripheral parts thereof.
Figure 8B:
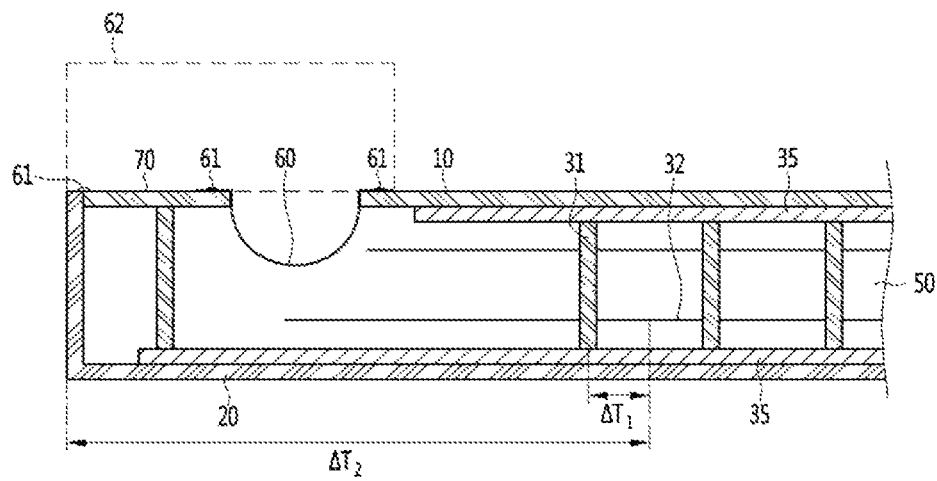
Figure 8C:
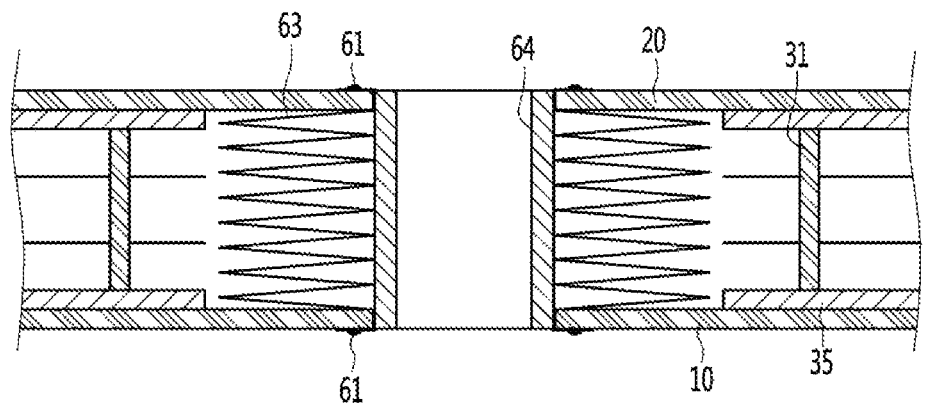

FIGS. 8A-8C are views showing various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 8A may be applied to the main body-side vacuum adiabatic body. Specifically, the first and second plate members 10 and 20 are to be sealed so as to vacuumize the interior of the vacuum adiabatic body. In this case, as the two plate members have different temperatures from each other, heat transfer may occur between the two plate members. Conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be provided as a porous material or a separate adiabatic structure.

A conductive resistance sheet proposed in FIG. 8B may be applied to the door-side vacuum adiabatic body. In FIG. 8B, portions different from those of FIG. 8A are described, and the same description is applied to portions identical to those of FIG. 8A. A side frame 70 is further provided at an outside of the conductive resistance sheet 60. A part for sealing between the door and the main body, an exhaust port necessary for an exhaust process, a getter port for vacuum maintenance, for example, may be placed on the side frame 70. This is because mounting of parts is convenient in the main body-side vacuum adiabatic body, but mounting positions of parts are limited in the door-side vacuum adiabatic body.

In the door-side vacuum adiabatic body, it is difficult to place the conductive resistance sheet 60 at a front end portion (front end) of the vacuum space part, i.e., a corner side portion (corner side) of the vacuum space part. This is because, unlike the main body, a corner edge portion (corner edge) of the door is exposed to the exterior. More specifically, if the conductive resistance sheet 60 is placed at the front end portion of the vacuum space part, the corner edge portion of the door is exposed to the exterior, and hence, there is a disadvantage in that a separate adiabatic part should be configured so as to heat-insulate the conductive resistance sheet 60.

A conductive resistance sheet proposed in FIG. 8C may be installed in the pipeline passing through the vacuum space part. In FIG. 8C, portions different from those of FIGS. 8A and 8B are described, and the same description is applied to portions identical to those of FIGS. 8A and 8B. A conductive resistance sheet having the same shape as that of FIG. 8A, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside of the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \quad [\text{Equation 1}]$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, and an amount, for example, of the porous material.

According to an embodiment, a temperature difference ΔT1 between a geometric center formed by adjacent bars 31 and a point at which each of the bars 31 is located may be provided to be less than 0.5° C. Also, a temperature difference ΔT2 between the geometric center formed by the adjacent bars 31 and an edge portion of the vacuum adiabatic body may be provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Under such circumferences, the plate members 10 and 20 and the side frame 70 may be made of a material having a sufficient strength with which they are not damaged by even vacuum pressure. For example, when the number of bars 31 is decreased so as to limit support conduction heat, deformation of the plate member occurs due to the vacuum pressure, which may negatively influence the external appearance of refrigerator. The radiation resistance sheet 32 may be made of a material that has a low emissivity and may be easily subjected to thin film processing. Also, the radiation resistance sheet 32 is to ensure a sufficient strength not to be deformed by an external impact. The supporting unit 30 is provided with a strength sufficient so as to support the force of the vacuum pressure and endure an external impact, and is to have machinability. The conductive resistance sheet 60 may be made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion (edge) of the radiation resistance sheet may generate conduction heat due to drooping caused by self-load of the radiation resistance sheet. Therefore, a stiffness of a certain level is required. The supporting unit 30 requires a stiffness enough to endure a compressive stress from the plate member and an external impact.

In an embodiment, the plate member and the side frame may have the highest stiffness so as to prevent deformation caused by the vacuum pressure. The supporting unit, particularly, the bar may have the second highest stiffness. The radiation resistance sheet may have a stiffness that is lower than that of the supporting unit but higher than that of the conductive resistance sheet. Lastly, the conductive resistance sheet may be made of a material that is easily deformed by the vacuum pressure and has the lowest stiffness. Even when the porous material 33 is filled in the vacuum space part 50, the conductive resistance sheet may have the lowest stiffness, and the plate member and the side frame may have the highest stiffness.

Hereinafter, the radiation resistance sheet installed in the supporting unit 30 will be described. The radiation resistance sheet according to an embodiment may maintain an installation interval in itself to sufficiently resist radiation heat. Also, after the radiation resistance sheet is installed, the radiation resistance sheet may be prevented from being shaken within the vacuum space part.

Figure 9:
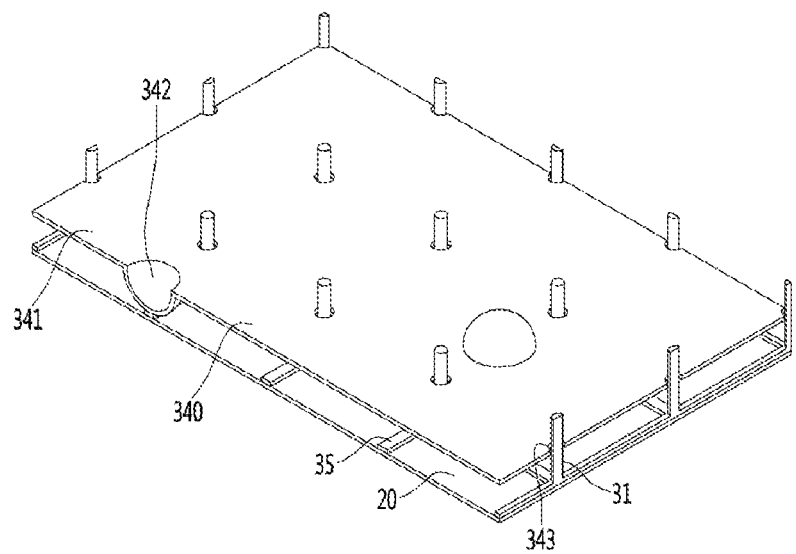
FIG. 9 is a partial perspective view of a supporting unit.
Figure 10:
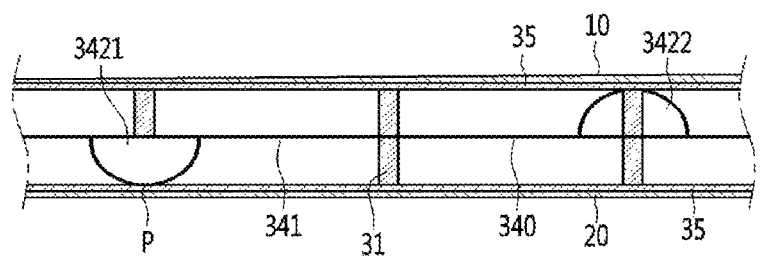
FIG. 10 is a partial cross-sectional view of the supporting unit.

FIG. 9 is a partial perspective view of the supporting unit. FIG. 10 is a partial cross-sectional view of the supporting unit.

Referring to FIGS. 9 and 10, the support plate 35 is placed inside of the plate member 20. Bar 31 may be provided on the support plate 35 to maintain an interval of the vacuum space part. The radiation resistance sheet is installed to cross the vacuum space part. The radiation resistance sheet may be made of an aluminum material having low emissivity.

The radiation resistance sheet will be described in more detail.

In order to resist radiation heat transfer, the interval through which the radiation heat is transferred is important. For this, the radiation resistance sheet may be maintained at a predetermined position. When the interval of the radiation resistance sheet is defined, a distance between the radiation resistance sheets and a distance between all members serving as a medium of the radiation heat transfer are accurately set and maintained.

In order to perform the position fixing function of the radiation resistance sheet, a through-hole 343 through which the bar 31 passes is provided in the radiation resistance sheet. The through-hole 343 may prevent the radiation resistance sheet from being shaken. In more detail, the through-hole 343 may prevent the radiation resistance sheet from being shaken in a left and right (lateral) direction or a vertical direction with respect to the ground.

The through-hole 343 may be provided with holes each of which has a first size and at least some of which are substantially coincident with or slightly larger than an outer diameter of the bar 31 in the edge portion (edge) of the radiation resistance sheet and holes each of which has a second size and in which a plurality of holes inside of the radiation resistance sheet are larger than the outer diameter of the bar 31. In this configuration, the holes each of which has the first size may be configured so that a position of the radiation resistance sheet is fixed by the bar, and the holes, each of which has the second size may not contact the bar to reduce heat transfer due to conduction.

To perform the interval fixing function of the radiation resistance sheet, the radiation resistance sheet includes a sheet base 341 provided in a two-dimensional flat plate shape and a sheet protrusion 342 protruding from the sheet base 341. The sheet protrusion 342 may have one side supported by the sheet base 341 and the other side supported by an opposite member, for example, the support plate 35. The sheet protrusion 342 may be manufactured by pressing the sheet base 341, or a separate sheet protrusion may be manufactured and then be coupled to the sheet base 341.

According to this configuration, the sheet base 341 may perform a function of shielding heat radiation between the plate members 10 and 20. The sheet protrusion 342 may maintain an interval between the sheet base 341 and the support plate 35. That is, even if the sheet base 341 moves in any one direction within the interval of the vacuum space part, the sheet base 341 may not move in a spacing direction by the sheet protrusion 342. Thus, the radiation resistance sheet may not move because the radiation resistance sheet is fixed to the interval that is reflected in the design. In the embodiment as described above, as the radiation resistance sheet stands up by itself, and thus, does not move in the spacing direction, the radiation resistance sheet may be called a self-standing type radiation resistance sheet 340.

As described above, the self-standing type radiation resistance sheet 340 may be made of a metal having low emissivity. The metal material has high thermal conduction properties. Thus, in order to prevent heat conduction, a tip P of the sheet protrusion 342 does not directly contact with the plate members made of the metal material. For this, the sheet protrusion 342 may not directly contact the plate member, but the support plate 35 may be disposed between the sheet protrusion and the plate member. The support plate 35 may be a product made of a resin material and has low thermal conductivity. Also, the tip P of the sheet protrusion 342 may be provided as a structure of a small cusp (flap). Thus, heat conduction on an interface may be reduced.

A position contacting the tip P of the sheet protrusion 342 is not limited to the support plate 35. Any member may be applied to the present embodiment as long as the member is disposed between the sheet protrusion 342 and the plate members 10 and 20 so as to block high heat conduction due to the contact.

The sheet protrusion 342 may have a hemispherical shape. This shape may have a function of allowing the sheet protrusion 342 to be manufactured through a method such as press processing on the sheet base 341 and a function of preventing the shape of the sheet protrusion 342, particularly, the tip P from being deformed. If the tip P is deformed, the contact area may increase, and thus, the heat conduction may increase.

The sheet protrusion 342 may be provided in each of both directions, but in one direction of the sheet base 341. Thus, even though one sheet of self-standing type radiation resistance sheet 340 is inserted into the vacuum space part, the interval of the sheet may be maintained.

In FIG. 10, a lower sheet protrusion 3421 disposed between the second plate member 20 and the self-standing type radiation resistance sheet 340 and an upper sheet protrusion 3422 disposed between the first plate member 10 and the self-standing type radiation resistance sheet 340 are illustrated. In the drawing, although only the two sheet protrusions 3421 and 3422 are illustrated to be described, a plurality of sheet protrusions that are required for fixing the interval of the self-standing type radiation resistance sheet 340 may be provided.

Various embodiments in which radiation heat transfer is blocked by the self-standing type radiation resistance sheet 340 will be described with reference to FIGS. 11 to 14.

Figure 11:
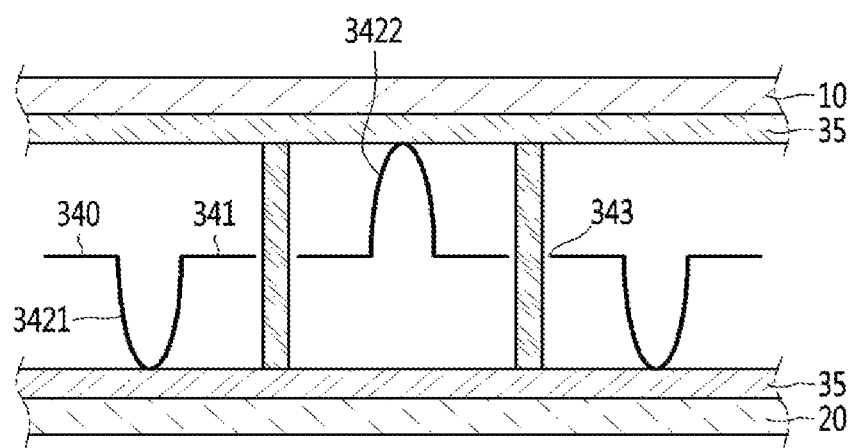
FIGS. 11 to 14 are views illustrating various examples in which radiation heat transfer is blocked by a self-standing type radiation resistance sheet.

FIG. 11 illustrates a basic shape in which one sheet of self-standing type radiation resistance sheet is installed. The self-standing type radiation resistance sheet 340 include the sheet base 341 and the sheet protrusion 342. The sheet protrusion 342 may be provided on each of upper and lower sides to maintain the vertical interval in which the self-standing type radiation resistance sheet 340 is placed. The sheet protrusion 342 contacts the support plate 35 but does not contact the plate members 10 and 20. Thus, heat conduction may be reduced.

A plurality of through-holes 343 are provided in the self-standing type radiation resistance sheet 340. The bar 31 is inserted into each of the through-holes 343. The self-standing type radiation resistance sheet 340 may be fixed in position by the supporting action of the bar 31 and the through-hole 343. That is, the through-hole 343 may prevent the radiation resistance sheet from being shaken in the left and right direction or the vertical direction with respect to the ground.

Figure 12:
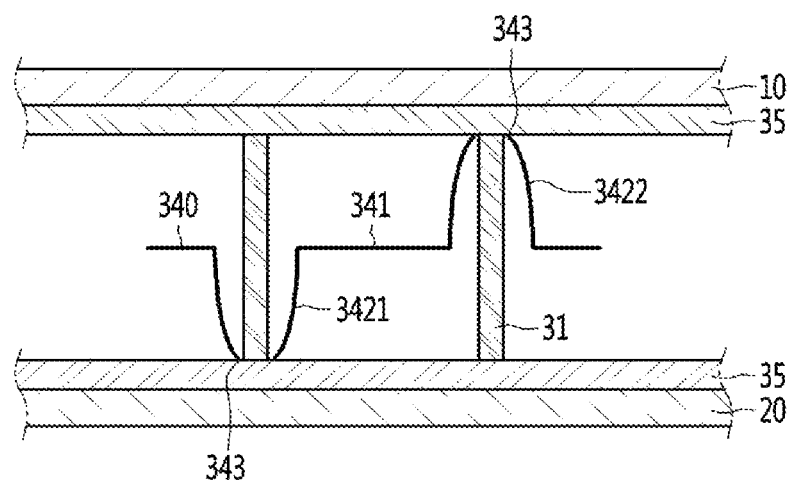

FIG. 12 illustrates a different shape in which one sheet of self-standing type radiation resistance sheet is installed. Other portions may be applied as they are to the description of FIG. 11 except for the installation of the through-hole 343.

Referring to FIG. 12, the through-hole 343 is defined in an end of the sheet protrusion 342. Thus, the self-standing type radiation resistance sheet 340 and the bar 31 may be easily aligned.

A component on which the bar 31 is installed, for example, a constituent supporting the bar 31 is provided on the support plate. For example, it is difficult to directly install the plate member made of the resin material on the plate members 10 and 20. Thus, when the sheet protrusion 342 and the through-hole 343 are provided together at the position on which the bar 31 is provided and the aligned position, it is unnecessary to separately consider the position of the tip P of the sheet protrusion for preventing the heat conduction, which is convenient.

The through-hole and the sheet protrusion, which are illustrated in FIGS. 11 and 12, may be provided together in a single self-standing type radiation resistance sheet 340.

Figure 13:
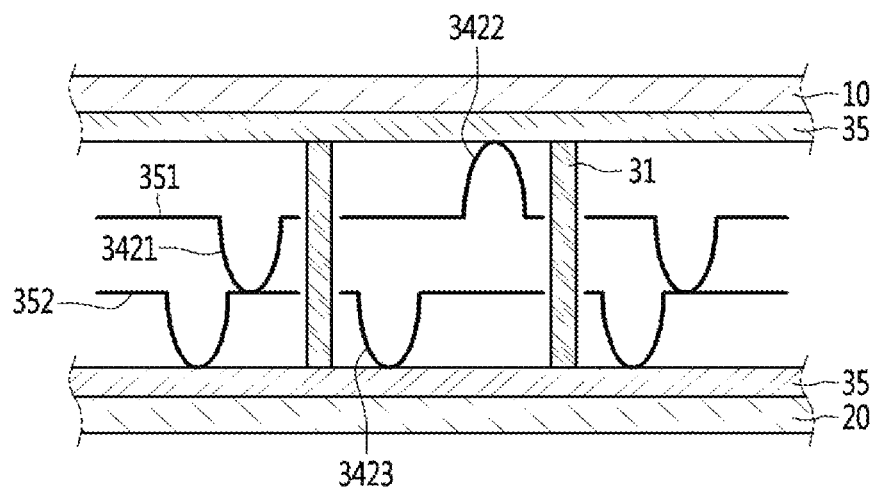

FIG. 13 illustrates an example in which two sheets of radiation resistance sheets are disposed in the vacuum space part. Referring to FIG. 13, a first self-standing type radiation resistance sheet 352 and a second self-standing type radiation resistance sheet 351 are vertically provided to overlap each other. In this case, three interval parts (intervals) are provided, and the sheet protrusion 342 is disposed in each of the three interval parts. Thus, the interval between the sheet and the plate member may be maintained. In FIG. 13, reference numerals 3421, 3422, and 3423 may be understood as parts for maintaining the interval. The reference numeral 3423 denotes a single-layer sheet protrusion when the protrusion is provided on only one surface of the sheet base 341 in the self-standing type radiation resistance sheet 351.

In the second self-standing type radiation resistance sheet 351, the sheet protrusion is provided on each of both surfaces. In the first self-standing type radiation resistance sheet 352, the sheet protrusion is provided on only one surface. However, the embodiment is not limited thereto. For example, in the second self-standing type radiation resistance sheet 351, the sheet protrusion may be provided on each of both surfaces. In the first and second self-standing type radiation resistance sheets, the sheet protrusion may be provided on each of both the surfaces.

Figure 14:
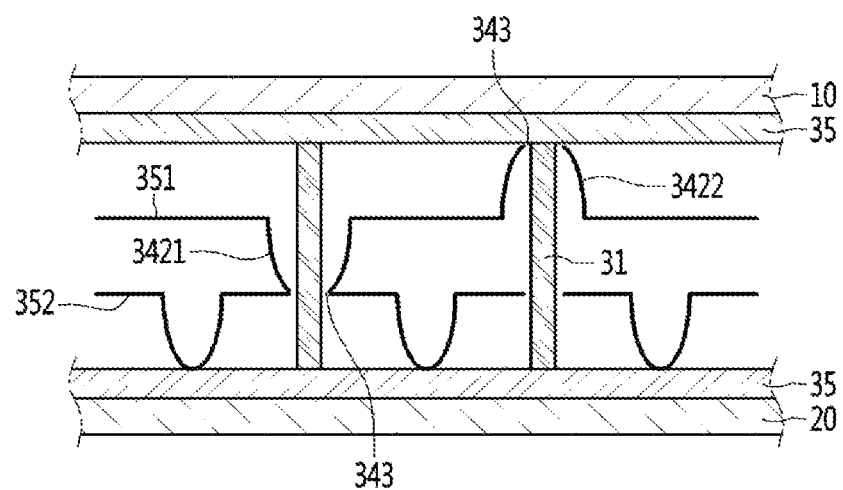

FIG. 14 illustrates another example in which two sheets of radiation resistance sheets are disposed in the vacuum space part. Other portions may be applied as they are to the description of FIG. 13 except for the installation of the through-hole 343.

Referring to FIG. 14, the through-hole 343 may be provided in the sheet protrusion 342. In this case, the advantage of the through-hole 343 of FIG. 13 and the advantage of the sheet protrusion 342 of FIG. 13 may be obtained together.

Although one or two self-standing type radiation resistance sheets 340 are provided, the embodiment is not limited thereto. For example, three or more self-standing type radiation resistance sheets 340 may be laminated.

Hereinafter, a modified example of the self-standing type radiation resistance sheet will be described.

Figure 15:
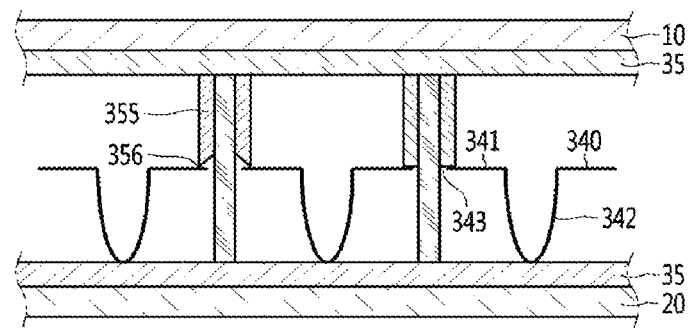
FIG. 15 is a cross-sectional view of a supporting unit according to a first modified example.

FIG. 15 is a cross-sectional view of a supporting unit according to a first modified example. Referring to FIG. 15, the sheet protrusion 342 is provided on only one surface of the self-standing type radiation resistance sheet 340. The other surface of the self-standing type radiation resistance sheet 340 may contact the support plate 35. However, an interval may be provided between the self-standing type radiation resistance sheet 340 and the plate member to resist to the radiation heat transfer.

For this, a boss 355 extending from the support plate 35, i.e., a support protrusion 356 may be supported on the other surface of the self-standing type radiation resistance sheet 340. The boss 355 may constitute a position of the bar 31 and be inserted into the other protrusion extending from the facing support plate 35. An inlet end of the support protrusion 356 may be inclined so that the boss 355 is easily inserted into the other protrusion.

In case of the modified example, an end of the sheet protrusion 342 may not directly contact the plate member but be disposed on a separate member such as the support plate 35 that is resist to the heat conduction.

Figure 16:
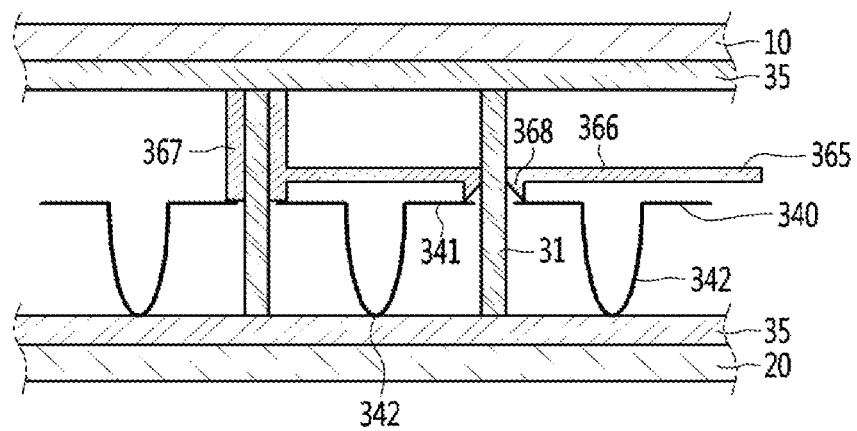
FIG. 16 is a cross-sectional view of a supporting unit according to a second modified example.

FIG. 16 is a cross-sectional view of a supporting unit according to a second modified example. The same description will be applied to the same constituent as that of the first modified example.

Referring to FIG. 16, the sheet protrusion 342 is provided on only one surface of the self-standing type radiation resistance sheet 340. The other surface of the self-standing type radiation resistance sheet 340 may be maintained in interval by a separate interval maintenance member 365, unlike the first modified example.

The interval maintenance member 365 includes an insertion guide 368 that allows the interval maintenance member 365 to be easily inserted into the 31 and a boss 367 maintaining an interval between the sheet base 341 and the plate member 10 and inserted into the bar 31. An inlet of the insertion guide 368 may be inclined to be widened toward an end thereof.

An interval frame 366 may be provided so that the insertion guide 368 and the boss 367 are connected to each other to form one body as the whole and thus conveniently handled. That is, the interval maintenance member 365 may be conveniently inserted at once.

According to the second modified example, the sheet protrusion 342 may contact the support plate 35 to support one side of the self-standing type radiation resistance sheet 340. The other side of the self-standing type radiation resistance sheet 340 may be supported by the boss 367.

The insertion guide 368 and the boss 367 may be provided as a single structure. That is, as a shape of the insertion guide 368 is provided in an end of the boss 367, an end of the inlet of the boss 367 may be inclined.

The bar 31 may directly contact any one side of the plate member 10. In this case, the first plate member 10 may provide a wall of an inner surface of the refrigerator, which is not visible through a naked eye of a user.

Figure 17:
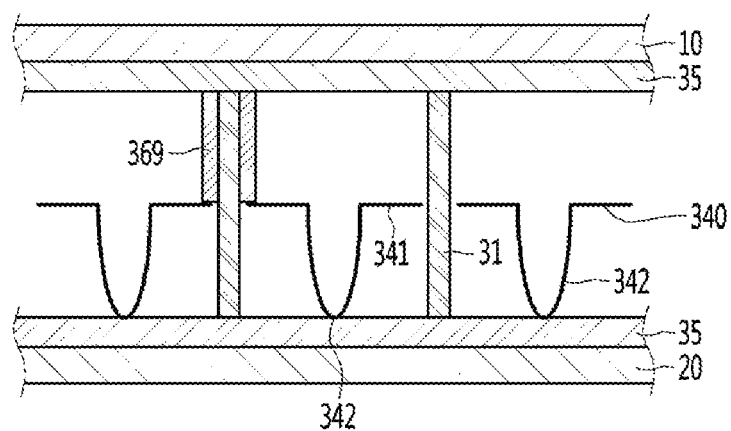
FIG. 17 is a cross-sectional view of a supporting unit according to a third modified example.

FIG. 17 is a cross-sectional view of a supporting unit according to a third modified example. The same description will be applied to the same part as that of other modified examples.

Referring to FIG. 17, the sheet protrusion 342 is provided on only one surface of the self-standing type radiation resistance sheet 340. Unlike other modified examples, the other surface of the self-standing type radiation resistance sheet 340 may be maintained to be spaced from the plate member 10 by the boss 369.

The boss 369 may be inserted and supported by the bar 31. Although not shown, an inlet of the boss 369 may be inclined to be widened toward an end thereof. Thus, the boss 369 may be conveniently inserted.

It is unnecessary to provide the boss 369 on all the bars 31. The number of bosses 369 that are required for supporting the other surface of the self-standing type radiation resistance sheet 340 may be provided.

The bar 31 may directly contact any one side of the plate member 10. In this case, the first plate member 10 may provide a wall of an inner surface of the refrigerator, which is not visible through a naked eye of a user.

Figure 18:
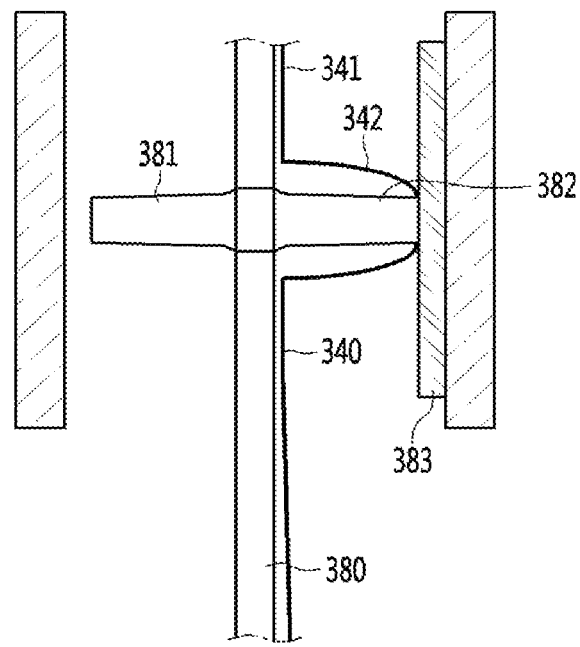
FIG. 18 is a cross-sectional view of a supporting unit according to a fourth modified example.

FIG. 18 is a cross-sectional view of a supporting unit according to a fourth modified example. Referring to FIG.

18, the other embodiment to which the self-standing type radiation resistance sheet 340 is applied may be the same as the modified example. A structure for providing the bar 31 may be characteristically different.

Particularly, to provide the bar 31, a support 380 widely provided in a lattice shape or a non-lattice shape at an approximately central portion in the interval of the vacuum space part and bars 381 and 382 extending in different directions toward both sides of the support 380, i.e., the pair of plate members 10 and 20.

The bars 381 and 382 may be called a left (first) bar 381 and a right (second bar 382 as a concept that is different from the different bar, respectively.

Two interval parts (intervals) may be provided between the support 380 and the plate member. The self-standing type radiation resistance sheet 340 may be fixed in position and interval at least one of the two interval part. The interval of the self-standing type radiation resistance sheet 340 may be maintained by allowing the sheet base 341 to contact the support 380 and allowing the sheet protrusion 342 to contact a conduction prevention tool 383.

The conduction prevention tool may prevent heat from being conducted to the plate member through the sheet protrusion 342. Although the support plate 35 serves as the conduction prevention tool 383, it is unnecessary to provide the conduction prevention tool 383 to the entire area of the plate member. That is, the conduction prevention tool 383 may be provided at only a position at which the end of the sheet protrusion 342 is disposed. For example, it is sufficient that a resin portion of the frame contacts the position of the sheet protrusion 342 in the frame having a coarse mesh shape. As the through-hole 343 is provided in the sheet protrusion 342, the self-standing type radiation resistance sheet 340 may be conveniently inserted into the bar 31.

Figure 19:
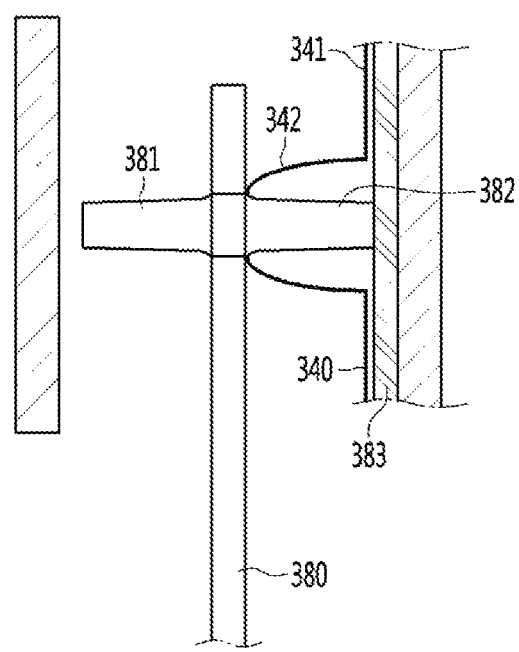
FIG. 19 is a cross-sectional view of a supporting unit according to a fifth modified example.

FIG. 19 is a cross-sectional view of a supporting unit according to a fifth modified example. The same description will be applied as it is to the same portion as that of the first modified example. Referring to FIG. 19, a contact direction of the sheet protrusion 342 in the self-standing type radiation resistance sheet 340 may not be a direction of the plate member but be a side of the support 380, unlike the fourth modified example.

Figure 20:
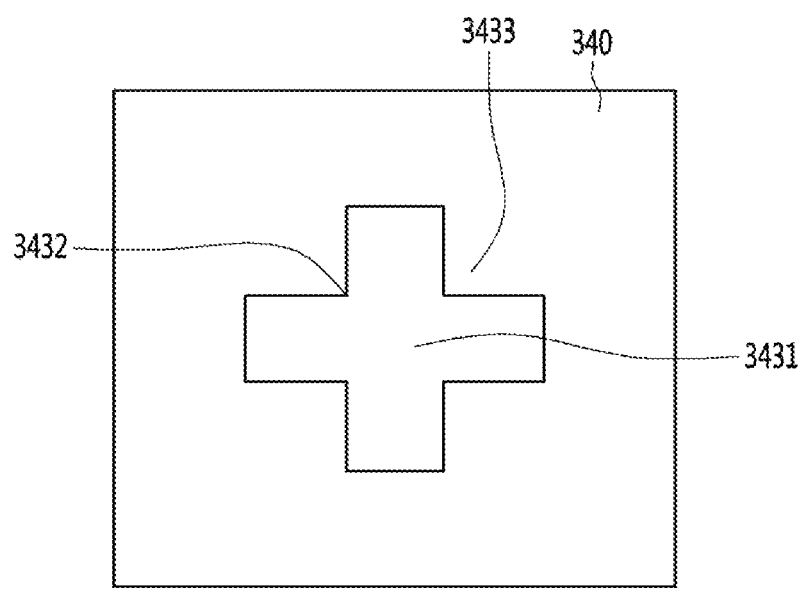
FIG. 20 is a plan view of the self-standing type radiation resistance sheet applied to a sixth modified example.

FIG. 20 is a plan view of the self-standing type radiation resistance sheet applied to a sixth modified example. The sixth modification is different in that the through-hole 343 has a cross shape, and thus, is provided as a cross-shaped through-hole 3431. When the bar 31 is inserted into the cross-shaped through-hole, a cusp (flap) 3432 provided on an edge of the cross-shaped through-hole 3431 may hole an outer surface of the bar 31.

Particularly, while the bar 31 is inserted into the cross-shaped through-hole 3431, a piece-shaped member 3433 may be bent and deformed in the insertion direction of the bar 31. After the bar 31 is inserted up to a predetermined depth, it is difficult to further insert the self-standing type radiation resistance sheet 340 because the bar 31 increases in thickness in the insertion direction. Also, it is difficult to release the self-standing type radiation resistance sheet 340 because the cusp 3432 presses the bar 31 in a releasing direction. A restoring force of the piece-shaped member 3433 acts, and the cusp 3432 holds and presses the bar 31 in the direction in which the self-standing-type radiation resistance sheet 340 is released. Thus, movement of the self-contained radiation resistance sheet 340 may be more difficult.

According to the sixth modified example, it is necessary to allow the sheet base 341 to contact and be supported by the support 380 or the conduction prevention tool 383. That is, due to action of the cusp 3432 holding the bar and change in thickness of the bars, the interval of the self-standing-type radiation resistance sheets 340 may be self-fixed with respect to the bar without any support action by other members. As the sheet protrusion 342 is fixed to the bar 31, the position of the self-contained radiation resistance sheet 340 may be also fixed.

Hereinafter, a vacuum pressure determined depending on an internal state of the vacuum adiabatic body. As already described above, a vacuum pressure is to be maintained inside of the vacuum adiabatic body so as to reduce heat transfer. At this time, it will be easily expected that the vacuum pressure is maintained as low as possible so as to reduce the heat transfer.

The case where only the supporting unit is applied will be described.

Figure 21:
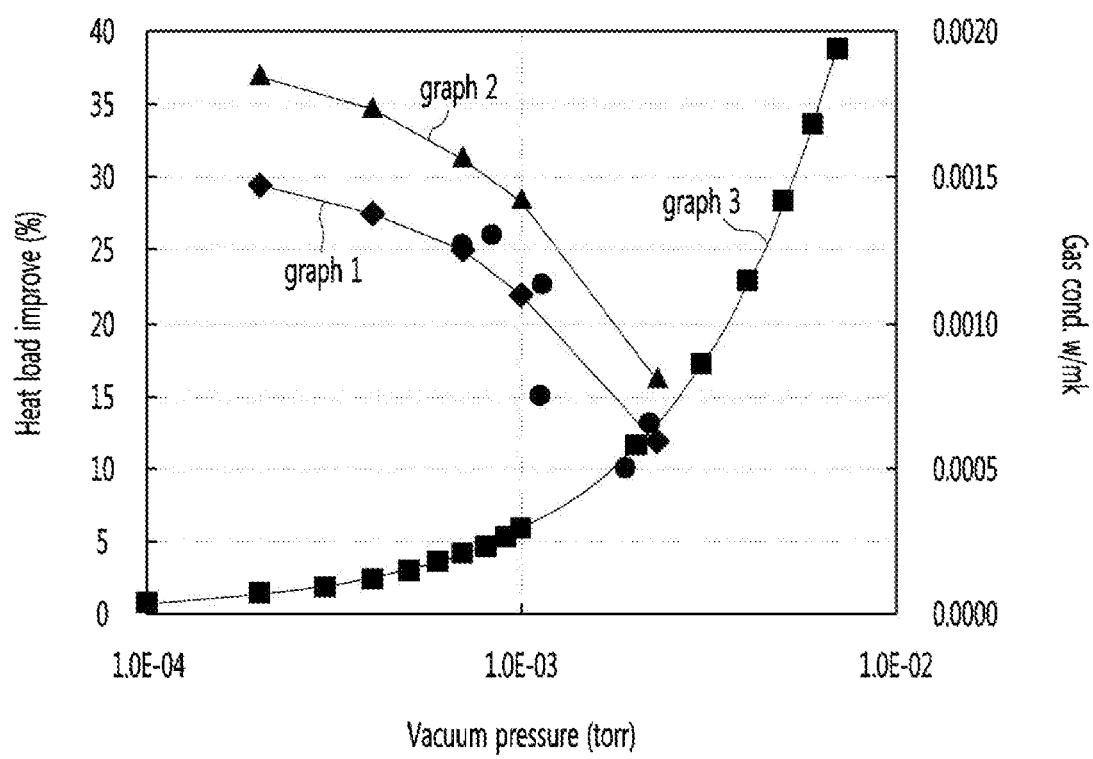
FIG. 21 illustrates graphs showing changes in adiabatic performance and changes in gas conductivity with respect to vacuum pressures by applying a simulation.

FIG. 21 illustrates graphs showing changes in adiabatic performance and changes in gas conductivity with respect to vacuum pressures by applying a simulation. Referring to FIG. 21, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving adiabatic performance. However, it may be seen that a degree of improvement of the adiabatic performance is gradually lowered. Also, it may be seen that, as the vacuum pressure is decreased, gas conductivity (Graph 3) is decreased. However, it may be seen that, although the vacuum pressure is decreased, a ratio at which the adiabatic performance and the gas conductivity are improved is gradually lowered. Therefore, the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 22:
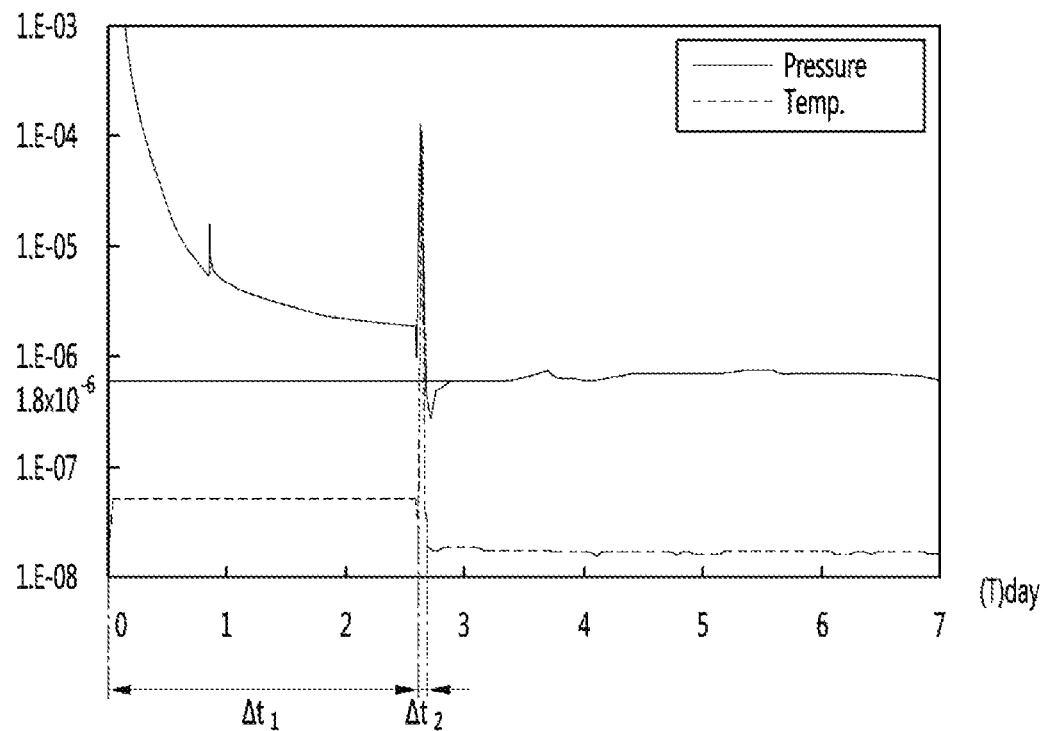
FIG. 22 is a graph illustrating results obtained by observing a time and a pressure in a process of exhausting an inside of the vacuum adiabatic body when a supporting unit is used.

FIG. 22 is a graph illustrating results obtained by observing a time and a pressure in a process of exhausting the inside of the vacuum adiabatic body when a supporting unit is used. Referring to FIG. 22, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more ($\Delta T1$). After that, the getter is activated by disconnecting the vacuum space part 50 from the vacuum pump and applying heat to the vacuum space part 50 ($\Delta T2$). If the getter is activated, the pressure in the vacuum space part 50 is decreased for a certain period of time, but then normalized to maintain a vacuum pressure of a certain level. The vacuum pressure that maintains the certain level after activation of the getter is approximately $1.8 \times 10{-}6$ Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to $1.8 \times 10{-}6$ Torr.

Figure 23:
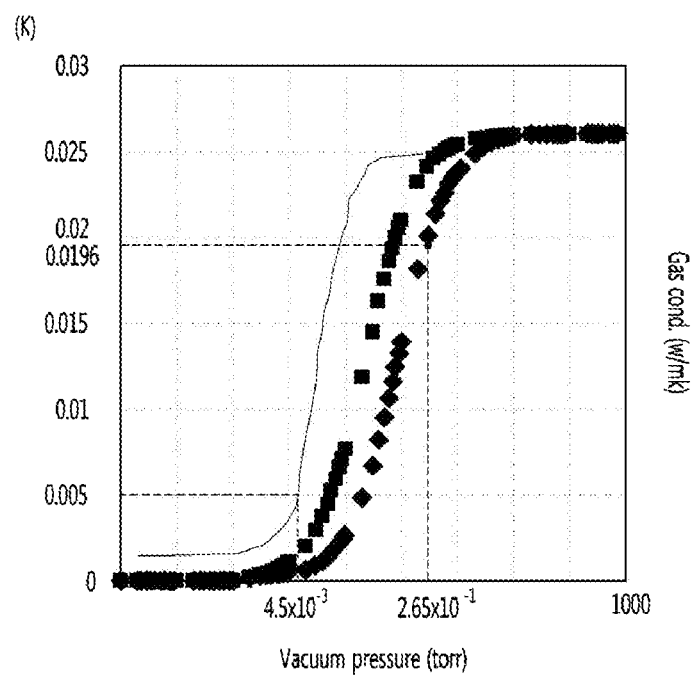
FIG. 23 is a graph illustrating results obtained by comparing a vacuum pressure with gas conductivity.

FIG. 23 is a graph obtained by comparing a vacuum pressure with gas conductivity. Referring to FIG. 23, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to an adiabatic material formed by foaming polyurethane, the vacuum pressure is 2.65×10−1 Torr even when the size of the gap is 2.76 mm. It was seen that the point at which reduction in adiabatic effect caused by gas conduction heat is saturated even though the vacuum pressure is decreased is a point at which the vacuum pressure is approximately 4.5×10−3 Torr. The vacuum pressure of 4.5×10−3 Torr may be defined as the point at which the reduction in adiabatic effect caused by gas conduction heat is saturated. Also, when the effective heat transfer coefficient is 0.1 W/mK, the vacuum pressure is 1.2×10−2 Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately 2.0×10−4 Torr. Also, the vacuum pressure at the point at which the reduction in adiabatic effect caused by gas conduction heat is saturated is approximately 4.7×10−2 Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is in the middle between the vacuum pressure when only the supporting unit is used and the vacuum pressure when only the porous material is used.

In the description of embodiments, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in embodiments may be applied to refrigerators. However, the application of the vacuum adiabatic body is not limited to the refrigerators, and may be applied in various apparatuses, such as cryogenic refrigerating apparatuses, heating apparatuses, and ventilation apparatuses.

According to embodiments, the vacuum adiabatic body may be industrially applied to various adiabatic apparatuses. The adiabatic effect may be enhanced, so that it is possible to improve energy use efficiency and to increase the effective volume of an apparatus.

The invention claimed is:

1. A vacuum adiabatic body, comprising:
a first plate defining at least a portion of a wall for a first space;
a second plate defining at least a portion of a wall for a second space having a second temperature different from a first temperature of the first space;
a sealing that seals the first plate and the second plate to provide a third space having a third temperature between the first temperature and the second temperature, the third space being a vacuum space;
a support plate including a first surface that contacts one of the first plate or the second plate and a second surface opposed to the first surface; and
a heat resistance unit that reduces a heat transfer amount between the first plate and the second plate, wherein the heat resistance unit comprises:
a sheet base provided in a direction crossing the third space to shield heat radiation between the first and second plates; and
at least one sheet protrusion that protrudes from the sheet base in a direction toward the one of the first plate or the second plate to maintain an interval between the sheet base and the support plate, wherein the sheet base and the at least one sheet protrusion are made of a material having a lower emissivity than a material of the first plate or the second plate, wherein the support plate is made of a material having a lower heat transfer coefficient than a material of the first plate or the second plate, and wherein the at least one sheet protrusion includes a peak that contacts the second surface of the support plate.

2. The vacuum adiabatic body according to claim 1, further comprising a support that maintain the third space, wherein the support comprises:
at least one bar that maintains an interval between the first plate and the second plate in the third space, wherein the heat resistance unit comprises at least one self-standing type radiation resistance sheet, and wherein at least one through-hole through which the at least one bar passes is provided in the self-standing type radiation resistance sheet.

3. The vacuum adiabatic body according to claim 2, wherein the at least one bar comprises a plurality of bars and the at least one through-hole comprises a plurality of through-holes, wherein the plurality of through-holes through which the plurality of bars pass have a first size at an edge of the sheet base and a second size at an inner portion of the sheet base, and wherein the second size is larger than the first size.

4. The vacuum adiabatic body according to claim 2, wherein the at least one through-hole is defined in an end of the at least one sheet protrusion.

5. The vacuum adiabatic body according to claim 1, wherein the at least one sheet protrusion comprises a plurality of sheet protrusions provided on first and second surfaces of the sheet base, respectively.

6. The vacuum adiabatic body according to claim 1, wherein the heat resistance unit comprises at least two self-standing type radiation resistance sheets laminated together.

7. The vacuum adiabatic body according to claim 6, wherein, in at least one of the at least two laminated self-standing type radiation resistance sheets, the at least one sheet protrusion comprises a plurality of sheet protrusions provided on each of first and second surfaces of the sheet base, respectively.

8. The vacuum adiabatic body according to claim 1, wherein the heat resistance unit comprises a self-standing type radiation resistance sheet, and further comprising:
at least one bar that maintains an interval between the first plate and the second plate in the third space; and
at least one boss in which the at least one bar is inserted and configured to support a surface of the self-standing type radiation resistance sheet.

9. The vacuum adiabatic body according to claim 8, wherein the at least one boss is provided as one body with the support plate.

10. The vacuum adiabatic body according to claim 9, wherein the at least one boss directly contacts the support plate and the sheet base.

11. The vacuum adiabatic body according to claim 8, wherein the at least one boss comprises a plurality of bosses, and wherein an interval maintenance member connects the plurality of bosses to each other to form one body.

12. The vacuum adiabatic body according to claim 11, wherein an insertion guide having an inclined inlet is provided to mount the interval maintenance member.

13. The vacuum adiabatic body according to claim 1, wherein the at least one sheet protrusion has a hemispherical shape.

14. The vacuum adiabatic body according to claim 1, wherein the heat resistance unit comprises a self-standing type radiation resistance sheet, and wherein a conduction prevention tool is disposed between the self-standing type radiation resistance sheet and the one of the first plate or the second plate.

15. The vacuum adiabatic body according to claim 1, further comprising a support that maintain the third space, wherein the support comprises:
a base support provided to cross the third space; and
a pair of bars that extends in both directions from the base support, respectively.

16. The vacuum adiabatic body according to claim 1, wherein the sheet base and the at least one sheet protrusion are made of aluminum, and the first plate or the second plate is made of stainless steel.

17. A refrigerator, comprising:
a main body having an internal space in which goods are stored;
a door configured to open and close the internal space; and
a refrigeration cycle to supply cold air into the internal space, wherein the refrigeration cycle comprises:
a compressor that compresses a refrigerant;
a condenser that condenses the compressed refrigerant;
an expansion valve that expands the condensed refrigerant; and
an evaporator that evaporates the expanded refrigerant to dissipate heat, wherein the door or the main body comprises a vacuum adiabatic body, and wherein the adiabatic body comprises:
a first plate defining at least a portion of a wall for a first space;
a second plate defining at least a portion of a wall for a second space having a second temperature different from a first temperature of the first space;
a sealing that seals the first plate and the second plate to provide a third space having a third temperature between the first temperature and the second temperature, wherein the third space is a vacuum space;
at least one self-standing type radiation resistance sheet comprising a sheet base having a two-dimensional planar structure and including a groove that is recessed from an edge of the sheet base and a through hole formed in a position adjacent to a center of the sheet base, and at least one sheet protrusion that protrudes from at least one surface of the sheet base to fix an interval between the sheet base and one of the first plate or the second plate so as to reduce radiation heat transfer between the first plate and the second plate; and
a plurality of bars that maintains an interval between the first plate and the second plate in the third space and includes a first bar that passes through the through hole and a second bar that is inserted into the groove to fix the at least one self-standing type radiation resistance sheet, wherein a size of the through hole is larger than a size of the groove to prevent heat transfer due to a conduction of the sheet base and the first bar at the center of the sheet base.

18. The refrigerator according to claim 17, further comprising a conduction prevention tool that prevents the at least one sheet protrusion and the one of the first plate or the second plate from directly contacting each other.

19. A refrigerator, comprising:
a first plate defining at least a portion of a wall for a first space;
a second plate defining at least a portion of a wall for a second space having a second temperature different from a first temperature of the first space;
a sealing that seals the first plate and the second plate to provide a third space having a third temperature between the first temperature and the second temperature of the second space, wherein the third space is a vacuum space;
a support that maintains the third space,
the support comprising:
a first support plate and a second support plate, which extend parallel to the first plate and the second plate; and
first and second bars that extend perpendicular to the first plate and the second plate to maintain an interval between the first plate and the second plate, so that the support contacts each of the first plate and the second plate to prevent the first plate and the second plate from being deformed; and
first and second radiation resistance sheets laminated between the first plate and the second plate, wherein the first radiation resistance sheet comprises a first sheet base of a planar shape having a first through hole through which the first bar passes and a first sheet protrusion that protrudes from the first sheet base and includes a first peak to contact the first support plate, wherein the second radiation resistance sheet comprises a second sheet base of a planar shape having a second through hole through which the second bar passes and a second sheet protrusion that protrudes from the second sheet base and includes a second peak to contact the second support plate, and wherein the first sheet protrusion and the second sheet protrusion are positioned between the first and second bars.

20. A vacuum adiabatic body, comprising:
a first plate;
a second plate;
a vacuum space provided between the first plate and the second plate;
a support to maintain a distance between the first plate and second plate and being disposed next to the first plate, the support including a support plate provided in the first plate and first and second bars; and
a radiation resistance sheet to reduce heat radiation between the first plate and second plate and including a sheet base provided between the first plate and second plate and having a first through hole and a sheet protrusion that protrudes from the sheet base and contacts the support plate;
a boss that protrudes from the support plate and is positioned between the sheet base and the second plate; and
an interval frame that extends from an outer circumferential surface of the boss and crosses the vacuum space, the interval frame having a second through hole, wherein the first bar passes through the first through hole of the sheet base and is inserted into the boss, and the second bar passes through the second through hole of the boss and supports the support plate.

* * * * *